(12) United States Patent
Jung

(10) Patent No.: US 9,397,553 B2
(45) Date of Patent: Jul. 19, 2016

(54) SWITCHING MODE POWER SUPPLY, APPARATUS AND METHOD OF SUPPLYING POWER BY USING THE SAME, AND IMAGE FORMING APPARATUS THEREFOR

(75) Inventor: Hong-ki Jung, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 976 days.

(21) Appl. No.: 13/565,928

(22) Filed: Aug. 3, 2012

(65) Prior Publication Data

US 2013/0114313 A1    May 9, 2013

(30) Foreign Application Priority Data

Nov. 7, 2011    (KR) .................. 10-2011-0115358

(51) Int. Cl.
*G06K 15/00* (2006.01)
*H02M 1/36* (2007.01)
*H02M 3/335* (2006.01)
*H02M 1/00* (2006.01)

(52) U.S. Cl.
CPC ............ *H02M 1/36* (2013.01); *H02M 3/33507* (2013.01); *H02M 2001/0006* (2013.01)

(58) Field of Classification Search
None
See application file for complete search history.

(56) References Cited

U.S. PATENT DOCUMENTS

| | | | |
|---|---|---|---|
| 5,995,397 A | 11/1999 | Kim | |
| 6,052,291 A * | 4/2000 | Suzuki et al. | 363/21.12 |
| 6,104,622 A * | 8/2000 | Shin | 363/21.07 |
| 6,333,862 B1 * | 12/2001 | Lee et al. | 363/21.01 |
| 8,493,755 B2 * | 7/2013 | Terlizzi et al. | 363/65 |
| 2003/0151928 A1 * | 8/2003 | Kobori et al. | 363/21.01 |
| 2009/0295469 A1 * | 12/2009 | DuBose | 327/544 |
| 2009/0302816 A1 * | 12/2009 | Kunimatsu | 323/282 |
| 2010/0166449 A1 * | 7/2010 | Hong | 399/88 |
| 2011/0101775 A1 * | 5/2011 | Busch | 307/18 |
| 2011/0298281 A1 * | 12/2011 | So | 307/31 |
| 2011/0320845 A1 * | 12/2011 | Itoh | H04N 1/00904 713/330 |
| 2012/0099351 A1 * | 4/2012 | Kim | 363/50 |
| 2012/0134185 A1 * | 5/2012 | Shin et al. | 363/44 |
| 2012/0307530 A1 * | 12/2012 | Miyazaki | 363/21.01 |

FOREIGN PATENT DOCUMENTS

| | | |
|---|---|---|
| EP | 2395642 | 12/2011 |
| KR | 100180337 | 12/1998 |
| KR | 1999-0037458 | 10/1999 |
| KR | 1020070045001 | 5/2007 |
| KR | 1020080044086 | 5/2008 |
| KR | 1020080056953 | 6/2008 |

OTHER PUBLICATIONS

Extended European Search Report dated Feb. 5, 2014 issued in EP Application No. 12188216.1.
European Patent Office Action dated Mar. 15, 2016 in copending European Patent Application No. 12 188 216.1.

* cited by examiner

*Primary Examiner* — Ted Barnes
(74) *Attorney, Agent, or Firm* — Staas & Halsey LLP

(57) ABSTRACT

A switching mode power supply (SMPS) usable with an image forming apparatus receives an alternating current (AC) power from an external electric power supply source and outputs a direct current (DC) power. When a supply state of an electric power to the image forming apparatus is turned off, electric charges charged in a capacitor of the SMPS are discharged.

17 Claims, 8 Drawing Sheets

SWITCHING MODE POWER SUPPLY, APPARATUS AND METHOD OF SUPPLYING POWER BY USING THE SAME, AND IMAGE FORMING APPARATUS THEREFOR

CROSS-REFERENCE TO RELATED APPLICATIONS

This application claims the benefit of priority under 35 U.S.C. §119 from Korean Patent Application No. 10-2011-0115358, filed on Nov. 7, 2011, in the Korean Intellectual Property Office, the disclosure of which is incorporated herein in its entirety by reference.

BACKGROUND OF THE INVENTION

1. Field of the Invention

The present general inventive concept relates to a switching mode power supply, an apparatus and method of supplying power by using the switching mode power supply, and an image forming apparatus therefor, and in particular, a switching mode power supply that normally operates an image forming apparatus when the image forming apparatus is turned on after being turned off, by sensing a supply state of electric power to the image forming apparatus, an apparatus and method of supplying power by using the switching mode power supply, and an image forming apparatus therefor.

2. Description of the Related Art

Switching mode power supplies (SMPSs) change an alternating current (AC) power source supplied from a commercial power source into a direct current (DC) power source through a rectifying and an equalizing processes, convert the DC power source into a power source of a square wave type by using a switching device, such as a metal oxide semiconductor field effect transistor (MOSFET), and then obtain an appropriate output voltage that is used for electric appliances by using a transformer. An SMPS is a stabilized power source apparatus having a high efficiency and greater durability than those of a linear type power source supply and is advantageous in being small in size and light in weight.

Electronic products, such as image forming apparatuses, for example, printers or copying machines, require a power source supply that supplies power stably with a simple structure and a small size, and thus, mainly use an SMPS.

Energy consumption has greatly increased recently, and thus, countermeasures against energy shortage have been sought worldwide and regulations about energy consumption have become severe. In particular, various ways for reducing power consumption of electronic products have been suggested

SUMMARY OF THE INVENTION

The present general inventive concept provides a switching mode power supply (SMPS) to allow an image forming apparatus to operate normally when the image forming apparatus is turned on after being turned off, an apparatus and method of supplying power by using the SMPS, and an image forming apparatus therefor.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a switching mode power supply (SMPS) for an image forming apparatus, which receives an alternating current (AC) power from an external electric power supply source and outputs a direct current (DC) power, the SMPS including a transformer to transform an electric power input to a primary coil and to output the transformed electric power to a secondary coil, a switching unit connected to the primary coil to adjust the output of the transformer; and a blocking unit to block an electric power input to the switching unit based on a supply state of an electric power to the image forming apparatus.

The foregoing and/or other features and utilities of the present general inventive concept may also be achieved by providing a method of supplying an electric power of a switching mode power supply (SMPS), the method including determining a supply state of the electric power to an image forming apparatus, and blocking the electric power input to a switching unit that adjusts an output of the electric power that is transformed by a transformer of the SMPS, based on the determined supply state of the electric power to the image forming apparatus.

The foregoing and/or other features and utilities of the present general inventive concept may also be achieved by providing an image forming apparatus comprising a switching mode power supply (SMPS) that receives an alternating current (AC) power from an external electric power supply source and outputs a direct current (DC) power, wherein the SMPS includes a transformer f to transform an electric power input to a primary coil and outputting the transformed electric power to a secondary coil, a switching unit connected to the primary coil to adjust the output of the transformer, and a blocking unit to block an electric power input to the switching unit based on a supply state of an electric power to the image forming apparatus.

The foregoing and/or other features and utilities of the present general inventive concept may also be achieved by providing a switching mode power supply (SMPS) usable with an image forming apparatus to receive an alternating current (AC) power from an external electric power supply source and to output a direct current (DC) power, the SMPS including a transformer having a primary coil and a secondary coil to generate a driving voltage, a switching unit configured to receive the driving voltage and to perform a switching operation on the primary coil according to the received driving voltage, and a blocking unit configured to block the driving voltage from the switching unit according to a supply state of an electric power of the image forming apparatus.

The secondary coil may include a sub-secondary coil to generate one or more output voltages usable in one or more components of the image forming apparatus, and an auxiliary coil to generate the driving voltage usable in the switching unit.

The blocking unit may be disposed between the switching unit and the secondary coil to transmit the driving voltage from the secondary coil to the switching unit and to disconnect the driving voltage from the switching unit.

The blocking unit may discharge a potential remaining on a passage from the secondary coil to the switching unit until the driving voltage is lower than a reset voltage of the image forming apparatus to correspond to a rebooting.

The blocking unit may include a detector to detect the supply state from at least one of an input of the SMPS, an output of the SMPS, and a power on/off switch of one or more components of the image forming apparatus.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
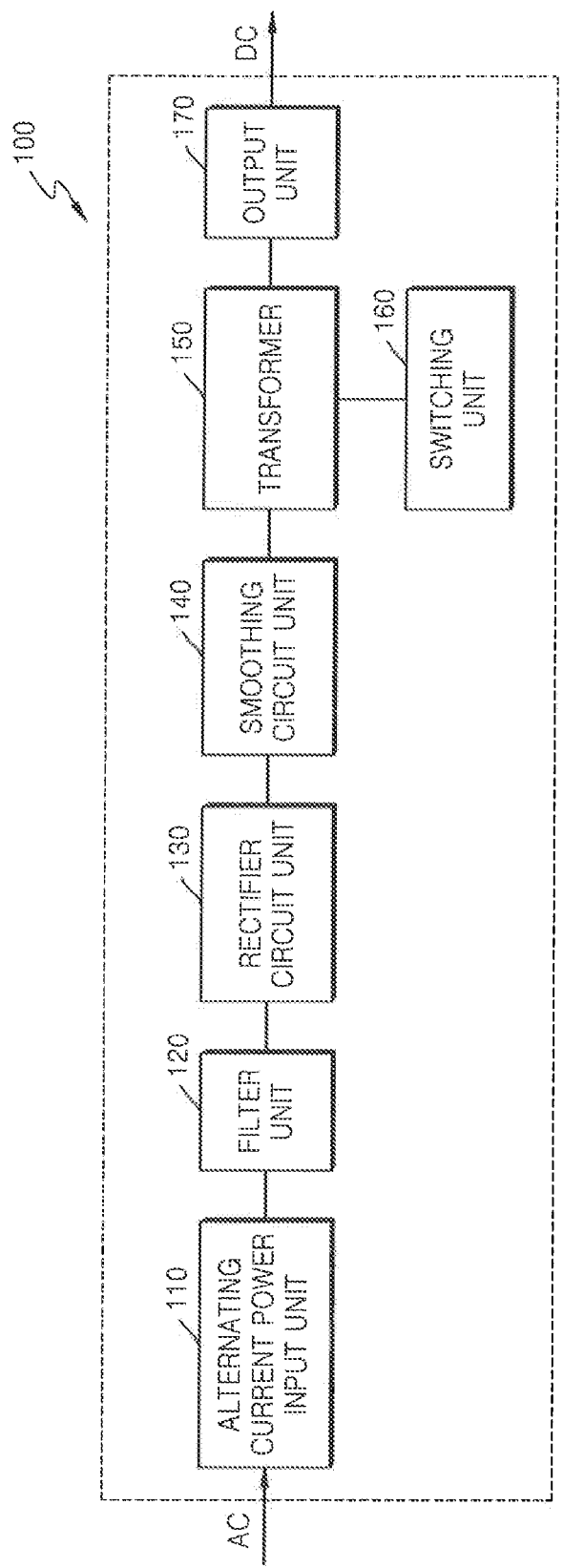
FIG. 1 is a block diagram illustrating a switching mode power supply (SMPS) usable with an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Embodiments of the present general inventive concept relate to a switching mode power supply (SMPS), and in particular, an SMPS usable with an image forming apparatus. A circuit type of the SMPS may be a non-isolation type, such as a buck type, a boost type, or a buck-boost type, or may be an isolation type, such as a flyback type, a forward type, or a push-pull type. Hereinafter, a flyback type SMPS having a relatively simple circuit structure is described as an embodiment. However, the present general inventive concept is not limited thereto. Since an SMPS is well known, detail descriptions of components of the SMPS are not provided here.

FIG. 1 is a block diagram of an SMPS 100 usable with an image forming apparatus according to an embodiment of the present general inventive concept. Referring to FIG. 1, the SMPS 100 usable with the image forming apparatus includes an alternating current (AC) power input unit 110, a filter unit 120, a rectifier circuit unit 130, a smoothing circuit unit 140, a transformer 150, a switching unit 160, and an output unit 170.

The AC power input unit 110 receives an AC power, a magnitude and direction of which periodically changes according to time, from an external power supply source. For example, in a country, an AC voltage of 220 V at 60 Hz is used as a standard voltage, and thus, the AC power input to the SPMS 100 from the external power supply source is the AC voltage of 220 V at 60 Hz.

The filter unit 120 removes electrical noise. That is, the filter unit 120 removes the electrical noise from the AC power input from the AC power input unit 110 or prevents electrical noise generated and introduced in the SPMS 100 from discharging out of the SPMS 100. The filter unit 120 may include an inductor that is referred to as a common mode choke and a capacitor, for example, an X-capacitor or a Y-capacitor. The filter unit 120 may be an electromagnetic interference (EMI) filter, and filters noise, such as the EMI generated and introduced in the AC power. EMI means that electromagnetic waves generated from an electronic product affect operations of the electronic product itself or other products.

The rectifier circuit unit 130 rectifies the AC power. The rectifier circuit unit 130 may use a bridge diode rectifying circuit, that is, a bridge rectifier. The bridge diode rectifying circuit is an arrangement of four diodes in a bridge circuit configuration. The bridge diode rectifying circuit outputs a voltage of constant polarity regardless of the polarity of input voltages.

The smoothing circuit unit 140 processes the rectified power so that the rectified power can be smoothed. That is, if the AC power is rectified through the rectifier circuit unit 130, the AC power is rectified into a pulsating current form, not a complete (constant) DC form, and the smoothing circuit unit 140 performs an operation of reducing ripples of the pulsating current. The smoothing circuit unit 140 may include a capacitor and a resistor. The capacitor reduces the ripples of the rectified power, and the resistor operates as a discharging resistor to discharge electric charges of the capacitor. Electric power may be consumed by the discharging resistor, and loading time may be extended.

The transformer 150 boosts or bucks the electric power input therein through the smoothing circuit unit 140 into a DC power of a predetermined level according to a turns ratio of a primary coil and a secondary coil. For example, an image forming apparatus may use DC voltages of 3.3 V, 5 V, and 12 V. However, a voltage having a large magnitude about 300 V is input to the primary coil of the transformer 150 through the smoothing circuit unit 140, and thus, the transformer 150 bucks the input voltage to an appropriate voltage that can be used by the image forming apparatus by appropriately adjusting the turns ratio.

In order to transfer energy from the primary coil to the secondary coil of the transformer 150, the electric current has to be changed periodically. However, as described above, the DC voltage that has passed through the smoothing circuit unit 140 is input to the primary coil of the transformer 150 of the SMPS 100 of the present embodiment, and thus, an apparatus is provided to change the electric current thereof. The switching unit 160 may perform the above-described function. For example, the switching unit 160 performs switching operations of turning on/off in order to change the electric power input to the primary coil of the transformer 150, and thus, the electric power of the square wave type may be formed.

The switching unit 160 includes a switch and a switch controller that controls the switch. The switch repeatedly performs the switching operations of turning on/turning off at a predetermined frequency of about tens of KHz. In a turned-on state, the energy is accumulated in the primary coil of the transformer 150, and in a turned-off state, the accumulated energy is transferred to the secondary coil of the transformer 150. As the turned-on state is increased, more energy may be accumulated, and accordingly, the energy transferred to the secondary coil also increases. The switch controller controls the period of the on/off states. The switch controller may be a pulse-width modulation integrated circuit (PWM IC). The switch controller monitors an output voltage from the SMPS and compares the output voltage with an appropriate voltage (reference voltage) required by the electronic product. If the output voltage is greater than the appropriate voltage required by the electronic product, the turned-on time is reduced, and if the output voltage is less than the appropriate voltage, the turned-on time is increased to maintain the output voltage constant or increase the output voltage.

The output unit 170 is a circuit connected to the secondary coil of the transformer 150 and removes ripples of the voltage that is transformed by the transformer 150 to output a final DC voltage. The output unit 170 may include a rectifying circuit. The output voltage output from the output unit 170 may be the DC voltage of about 3.3 V, 5 V, or 12 V, which may be appropriately used in the electronic product.

Figure 2:
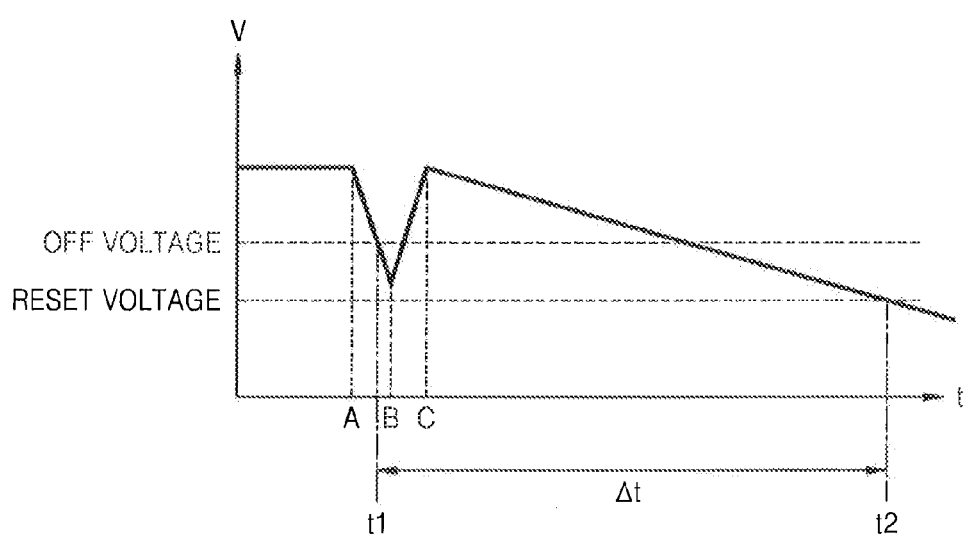
FIG. 2 is a graph illustrating a waveform of an output voltage from the SMPS of FIG. 1 when an electric power supplied to the image forming apparatus is in turned off state.

FIG. 2 is a graph illustrating a waveform of an output voltage from an SMPS when a supply state of an electric power to the image forming apparatus is a turned-off state. Referring to FIGS. 1 and 2, the graph illustrates the waveform of the output voltage from the SMPS, for example, the SMPS 100 of FIG. 1, when a discharging resistor of the smoothing circuit unit 140 is removed to reduce the power consumption and to improve light load efficiency. In the graph of FIG. 2, a transverse axis denotes time, and a longitudinal axis denotes an output voltage of an SMPS.

An image forming apparatus may use a voltage of 5 V that is output from the SMPS 100. In the graph of FIG. 2, an initial output voltage of the SMPS 100 is 5 V. The output voltage of the SMPS 100 is maintained at 5 V, and then when the electric power supplied to the image forming apparatus is blocked, the output voltage is changed according to a time axis.

The electric power supplied to the image forming apparatus is blocked prior to a time point A in the graph. When the electric power supplied to the image forming apparatus is blocked, the output voltage of the SMPS 100 is reduced during a first section between the time points A and B. In the first section, the output voltage of the SMPS 100 is gradually reduced, and the output voltage becomes lower than an off-voltage of a main board of the image forming apparatus. The output voltage of the SMPS 100 is equal to the off-voltage of the main board at a time point t1. That is, at the time point t1, the main board of the image forming apparatus is turned off. When the electric power supplied to the image forming apparatus is blocked, electric charges charged in the capacitor of the SMPS 100 are discharged. When charges are discharged, the output voltage of the SMPS 100 increases again after the time point B. Accordingly, the output voltage increases before the output voltage reaches a reset voltage, as illustrated in FIG. 2. In a second section between time points B and C, the output voltage of the SMPS 100 increases. The output voltage of the SMPS 100 is reduced again after a time point C, and the output voltage may be changed to a voltage lower than the reset voltage after a time point t2. Since the charges charged in a capacitor of the SMPS 100 are discharged even after the electric power supplied to the image forming apparatus is turned off, the switching operation of the switching unit 160 is performed temporarily, and thus, the time taken to reduce the output voltage to a voltage level lower than the reset voltage is increased.

Here, the main board of the image forming apparatus may be a main system of the image forming apparatus to control one or more components to perform an image forming operation. The image forming operation may include an operation of processing image data, an operation of driving the image forming component, and/or an operation of printing an image on a print medium. The main board may be turned on or off according to a user selection from a user switch formed on a housing of the image forming apparatus, a disconnection of the electric power from the image forming apparatus, an automatic selection from a corresponding component in a safety mode or a power saving mode of the image forming apparatus, etc.

If the supply of the electric power to the image forming apparatus is turned on again at any section between time points t1 and t2, the image forming apparatus may not reboot since the output voltage of the SMPS 100 is not reduced to a voltage level that is equal to or lower than the reset voltage.

The discharging resistor may be removed from the SMPS 100 to reduce the power consumption and improve the light load efficiency thereof. However, when the supply of the electric power to the image forming apparatus is turned on again within a predetermined time after the supply is turned off, there may be an error in rebooting the image forming apparatus. Therefore, the present general inventive concept provides an SMPS usable with an image forming apparatus, which may address the above problem, and at the same time, reduce power consumption and improve light loading efficiency.

In a normal operation of turning off and then on an image forming apparatus, the output voltage of the SMPS 100 may be immediately changed to a voltage lower than the reset voltage. Accordingly, a rebooting can be enabled in the image forming apparatus after the output voltage is lowered below the reset voltage. In an abnormal operation of turning off and then on the image forming apparatus, the output voltage of the SMPS 100 may not be immediately changed to a voltage lower than the reset voltage before the rebooting. Accordingly, an error or a malfunction occurs when the rebooting is performed before the output voltage is lowered below the reset voltage.

Figure 3:
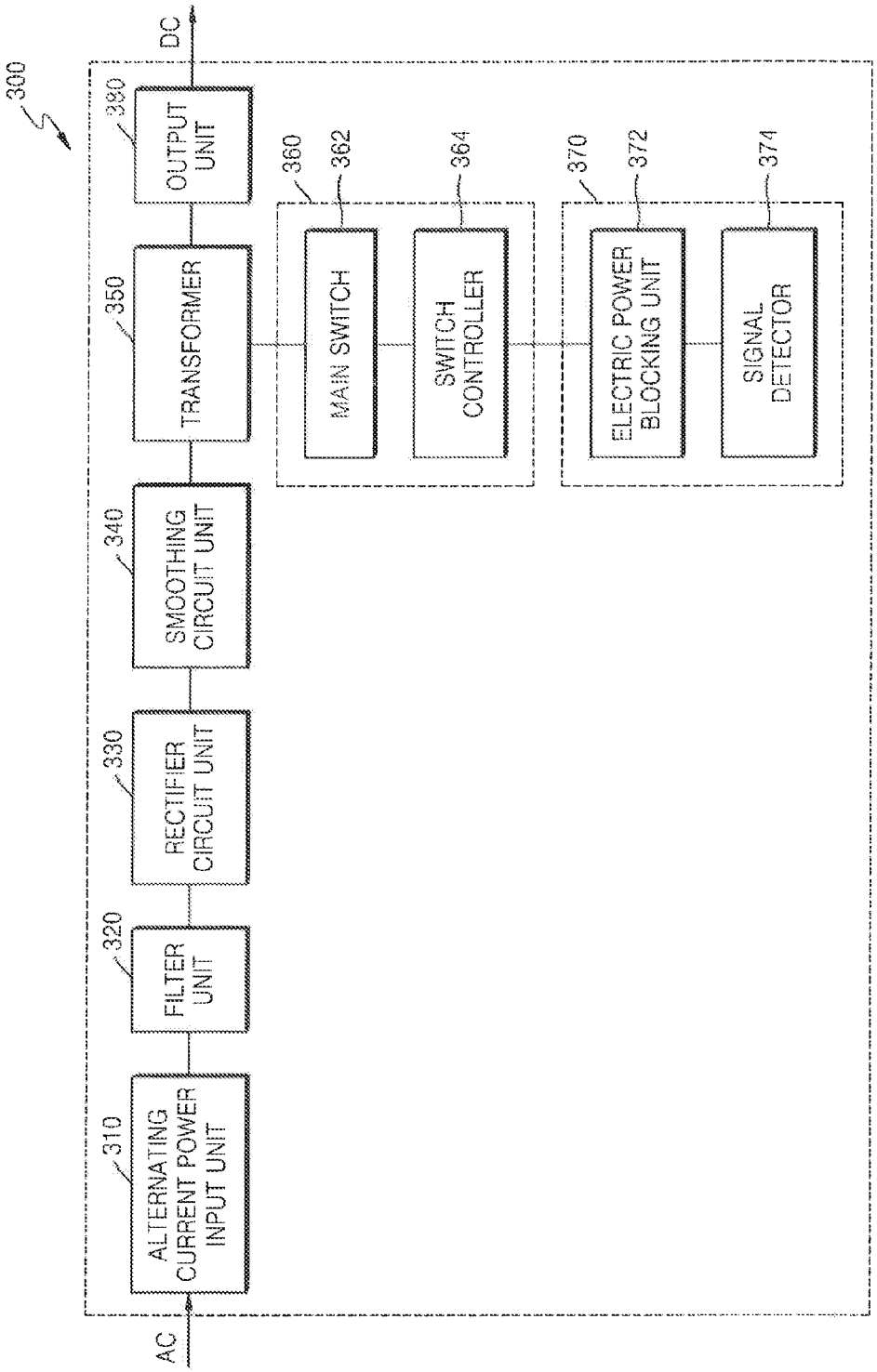
FIG. 3 is a block diagram of an SMPS usable with an image forming apparatus, according to an embodiment of the present general inventive concept.

FIG. 3 is a block diagram illustrating an SMPS 300 usable with an image forming apparatus according to an embodiment of the present inventive concept. The SMPS 300 may be included in various image forming apparatuses, such as printers, copying machines, facsimile machines, and multi-function machines. Referring to FIG. 3, the SMPS 300 usable with the image forming apparatus may include an AC power input unit 310, a filter unit 320, a rectifier circuit unit 330, a smoothing circuit unit 340, a transformer 350, a switching unit 360, a blocking unit 370, and an output unit 380. The switching unit 360 includes a main switch 362 and a switch controller 364. The blocking unit 370 includes an electric power blocking unit 372 and a signal detector 374. The SMPS 300 may include other components in addition to the above-described components to perform functions of the SMPS 300.

Among the components illustrated in FIG. 3, like components as those of FIG. 1 are not described here.

The smoothing circuit unit 340 may be formed by removing the discharging resistor from the smoothing circuit unit 140 of the SMPS 100 of FIG. 1 in order to reduce power consumption and improve light load efficiency. The smoothing circuit 340 may have a circuit without the above-described discharging resistor.

A primary circuit is connected to a primary coil of the transformer 350, and the output unit 380 is connected to a secondary coil of the transformer 350. The primary circuit may include the AC power input unit 310, the filter unit 320, the rectifier circuit unit 330, the smoothing circuit unit 340, the switching unit 360, and the blocking unit 370. The primary circuit and the output unit 380 may be insulated from each other by the transformer 350.

The switching unit 360 includes the main switch 362 that is connected to the primary coil of the transformer 350 to change the electric power input to the primary coil to transfer the electric power transformed by a turns ratio of the transformer 350 to the secondary coil, and the switch controller 364 connected to the main switch 362 to control the switching operation of the main switch 362. The switch controller 364 may be a PWM IC, and the main switch 362 is switched between an on state and an off state according to turning on/off periods according to a square wave type signal output from the PWM IC. An electric power to drive the switch controller 364 is input to an electric power input terminal of the switch controller 364. The electric power may be supplied as a driving voltage by feeding-back a voltage output from the output unit 380 by using an auxiliary winding in the transformer 350.

The blocking unit 370 blocks the driving voltage input to the switching unit 360, for example, the switch controller 364 of the switching unit 360, based on the supply state of the electric power to the image forming apparatus. That is, the blocking unit 370 prevents the electric power from inputting to the electric power input terminal of the switch controller 364 after the supply state of the electric power to the image forming apparatus is changed or turned off. The blocking unit 370 includes the electric power blocking unit 372 and the signal detector 374 and is located between an electric power supplying terminal that supplies the driving voltage to the switch controller 364 and the switching unit 360.

The electric power blocking unit 372 may be a circuit to prevent the driving voltage from inputting to the switch controller 364. For example, a discharge may occur so that the driving voltage supplied from the electric power supplying terminal may not be input to the switch controller 364, or an electric power input terminal of the switch controller 364 may be opened. The electric power blocking unit 372 receives a signal representing the supply state of the electric power to the image forming apparatus from the signal detector 374 to determine whether the driving voltage input to the switch controller 364 is to be blocked.

The signal detector 374 detects the supply state of the electric power to the image forming apparatus and outputs the detected state to the electric power blocking unit 372. The supply state of the electric power to the image forming apparatus may be detected from various points in the image forming apparatus. For example, a phase of the AC power flowing through a line connecting the AC power input unit 310 and the filter unit 320 may be sensed, or an intensity of the output voltage output from the SMPS 300 may be sensed. It is possible that another signal generated in the image forming apparatus to represent the electric power supply state may be sensed to detect the supply state of the electric power to the image forming apparatus. The signal representing the supply state of the electric power detected by the signal detector 374 is output to the electric power blocking unit 372.

It is possible that a disconnecting operation of the electric power between the switching unit 360 and the electric power supplying terminal and a discharging operation of a remaining potential of at least one of the electric power supplying terminal and the electric power blocking unit 370 can be simultaneously performed. That is, an electrical connection to supply the electric power as the driving voltage to the switching unit 360 from the electric power supplying terminal, which may include a secondary coil, a diode D2, and a capacitor C2, can be disconnected according to the detected signal representing the supply state of the electric power. Also, the remaining potential of at least one capacitor of the electric power supplying terminal and the electric power blocking unit 370 may be performed according to the detected signal representing the supply state of the electric power.

The blocking unit 370 may be operated according to the detected signal corresponding to at least one of a disconnecting operation of the AC between the AC input unit 310 and an external power source, an operation of a main power switch disposed between the AC input unit 310 and the output unit 380, an operation of a user command input through a user input unit to change the power supply state to the power off state, and an operation of an auxiliary power switch corresponding to an operational state of at least one component of an electrical apparatus using the SMPS 300 as a power source to operate the at least one component. Accordingly, the blocking unit 370 may be disposed and configured to receive the corresponding detected signal and to block the electric power according to the received detected signal.

According to the disconnecting operation, the switching controller 464 and main switch 462 can automatically terminate the switching operation to produce one or more levels of output voltages of the transformer 450 as outputs of the SMPS 300. It is possible that the switching controller 464 may detect the disconnection operation or no-supply of the electric power, and may stop the switching operation of the main switch 362 immediately after the detected disconnection operation.

When a detecting signal indicates a change of the supply state from a turned off state to a turn on state, the SMPS 300 start a new operation of outputting a voltage signal according to the switching operation of the switching unit 360. The new operation may include detecting the detecting signal, connecting the electric power from the electric power supplying terminal to the switching controller 364, and performing the switching operation of the switching controller 364 to control the main switch 362 so that the voltage signal is output from the transformer 350.

According to the above components, an error in a rebooting operation of the image forming apparatus described with reference to FIG. 2 may be prevented. When the supply state of the electric power to the image forming apparatus is turned off, the change of the state is detected by the signal detector 374. The signal detector 374 outputs a signal to the electric power blocking unit 372 to notify that the supply state of the electric power is changed or turned off. The electric power blocking unit 372 blocks the driving voltage input to the switch controller 364 so that the main switch 362 may not perform the switching operation, since the supply state of the electric power is turned off. When the driving voltage input to the switch controller 364 is blocked, the operation of the switch controller 364 is stopped, and accordingly, the switching operation of the main switch 362 is terminated. In other words, after the supply state of the electric power to the image forming apparatus is changed or turned off, the driving voltage input to the switch controller 364 is blocked to suspend the switching operation of the switching unit 360, and accordingly, transferring of the electric charges that are discharged in the capacitor of the SMPS 300 to the secondary coil of the transformer 350 may be prevented. Consequently, the output voltage of the SMPS 300 does not rise again like at the time point B of FIG. 2, and thus, the output voltage may be lowered rapidly under the reset voltage so that the rebooting operation of the image forming apparatus may be performed without an error.

Figure 4:
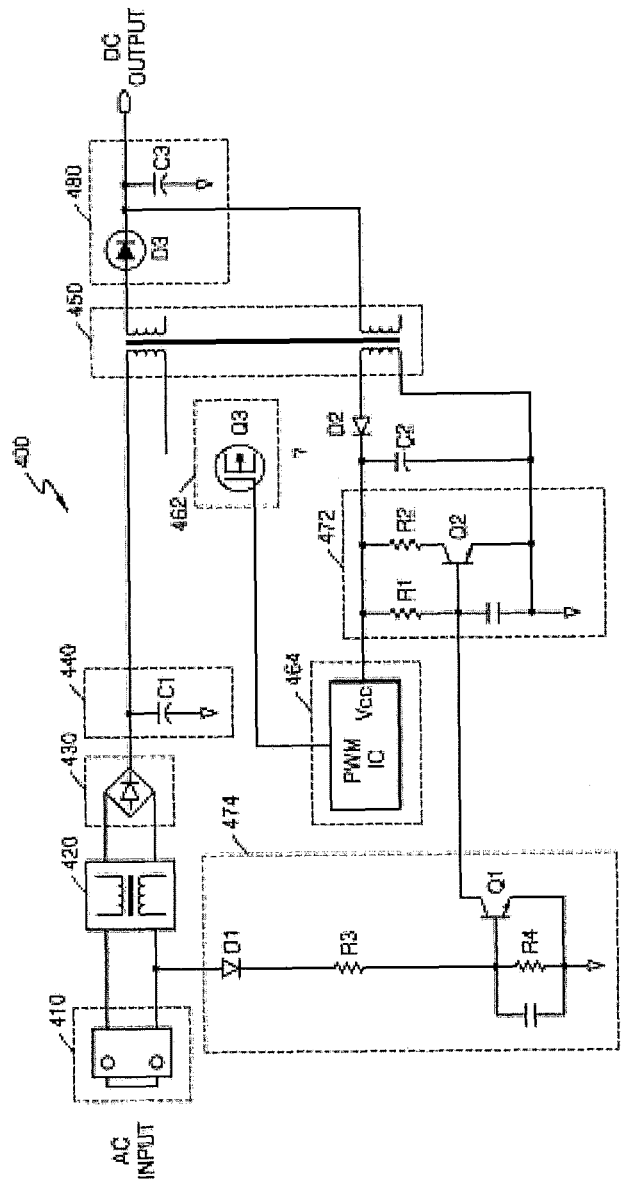
FIG. 4 is a circuit diagram illustrating an SMPS usable with an image forming apparatus according to an embodiment of the present general inventive concept.

FIG. 4 is a circuit diagram illustrating an SMPS 400 usable with an image forming apparatus according to an embodiment of the present inventive concept. Referring to FIG. 4, the SMPS 400 usable with the image forming apparatus includes an AC power input unit 410, a filter unit 420, a rectifier circuit unit 430, a smoothing circuit unit 440, a transformer 450, a main switch 462, a switch controller 464, an electric power blocking unit 472, a signal detector 474, and an output unit 480. The main switch 462 and the switch controller 464 may be referred to as a switching unit. The electric power blocking unit 472 and the signal detector 474 may be referred to as a blocking unit.

The AC power input unit 410 receives an AC input (AC power) from an external electric power supply source and transfers the AC power to the filter unit 420. The AC power, noise of which is removed by the filter unit 420, is input to the rectifier circuit unit 430 to be rectified. The rectified power is changed to the DC voltage, ripples of which are reduced, by passing through the smoothing circuit unit 440. The power (electric power) that has passed through the smoothing circuit unit 440 is input to a primary coil of the transformer 450, and the electric power input to the primary coil is changed according to a switching operation of the main switch 462. The main switch 462 may be realized as a MOSFET, as illustrated in FIG. 4. However, the present inventive concept is not limited thereto. Various switching devices may be used as the main switch 462. According to the switching operation of the main switch 462, accumulation and transferring of energy are performed in the transformer 450 according to the switching operation. The voltage transformed by the transformer 450 is transferred to a secondary coil thereof, and a stable DC voltage may be output by a circuit including a diode D3 and a capacitor C3 included in the output unit 480. The output unit 480 may include a half-wave rectification circuit, as illustrated in FIG. 4. However, the present inventive concept is not limited thereto. The output unit 480 may include a rectification circuit, such as a full-wave rectification circuit, different from the circuit of the diode D3 and the capacitor C3.

The switching operation of the main switch 462 is controlled by a switching control signal output from the switch controller 464, and the switch controller 464 may be a pulse width modulation integrated circuit (PWM IC), as illustrated in FIG. 4. A circuit including an auxiliary winding of the transformer 450 and a diode D2 and a capacitor C2 connected to the auxiliary winding may be referred to as an electric power supplying terminal to supply an electric power to an electric power input terminal Vcc of the PWM IC. The electric power may be usable to drive the PWM IC as a driving voltage. The electric power applied to the auxiliary winding may be supplied to the electric power input terminal Vcc of the PWM IC as a DC voltage, ripples of which are removed by the circuit including the diode D2 and the capacitor C2. The electric power supplying terminal may include a half-wave rectification circuit, as illustrated in FIG. 4. However, the present inventive concept is not limited thereto. The electric power supplying terminal may include a rectification circuit, such as a full-wave rectification circuit, different from the circuit of diode D2 and the capacitor C2. The driving voltage supplied into the electric power input terminal Vcc of the PWM IC may be blocked by the electric power blocking unit 472. When the electric power as the driving voltage to drive the PWM IC is blocked, the PWM IC may not output the switching control signal to the main switch 462, and thus, the switching operation of the main switch 462 is terminated and the energy is not transferred from the primary coil to the secondary coil of the transformer 450.

The PWM IC of the switching controller 464 may be controlled by a controller (main board or main system) of the image forming apparatus. The PWM IC may receive a control signal from the controller and may generate the switching control signal upon receiving the electric power or the driving voltage.

According to the embodiment of the SMPS 400 illustrated in FIG. 4, the signal detector 474 is connected to a line connecting the AC power input unit 410 and the filter unit 420 to each other to sense the AC power as a sensed signal. The supply state of the electric power to the image forming apparatus may be identified or determined according to the sensed signal. For example, the AC power may be sensed by allowing the line connecting the AC power input unit 410 and the filter unit 420 to pass through a current transformer or a zero current transformer.

When the supply state of the electric power to the image forming apparatus is a turned-on state, a transistor Q1 of the signal detector 474 is connected to a diode D1 through resistors R3 and R4 when the electric current flows to a base terminal of the transistor Q1. When the transistor Q1 is connected to the diode D1, a base terminal of a transistor Q2 of the electric power blocking unit 472 is connected to a potential, for example, a ground GND, and thus, the transistor Q2 of the electric power blocking unit 472 does not operate or is in a non-operable state. Therefore, the driving voltage is supplied to the electric power input terminal Vcc of the PWM IC, and the PWM IC outputs the switching control signal to control the switching operation of the main switch 462.

When the supply state of the electric power to the image forming apparatus is the turned-off state, the electric current does not flow to the base terminal of the transistor Q1 of the signal detector 474, and the transistor Q1 does not operate or is in a non-operable state. An electric current flows to the base terminal of the transistor Q2 of the electric power blocking unit 472 through the resistor R1, and charges of the capacitor C2 are discharged through the resistor R2 and the transistor Q2, and accordingly the driving voltage is not supplied to the electric power input terminal Vcc of the PWM IC. Then, the driving voltage at the electric power input terminal Vcc of the PWM IC is rapidly lowered below a reset voltage of the PWM IC so that the PWM IC may not output the switching control signal.

The electric power supplying terminal with the diode D2 and the capacitor C2 may be referred to an auxiliary power source to supply the driving voltage to the PWM IC of the switching controller 464. The electric power blocking unit 472 may be a passage to transmit the driving voltage to the PWM IC of the switching controller 464, may be a switch to disconnect the transmission of the driving voltage, and/or may be a discharging unit to discharge a potential remaining in the auxiliary power source and/or the electric power blocking unit 472.

Figure 5:
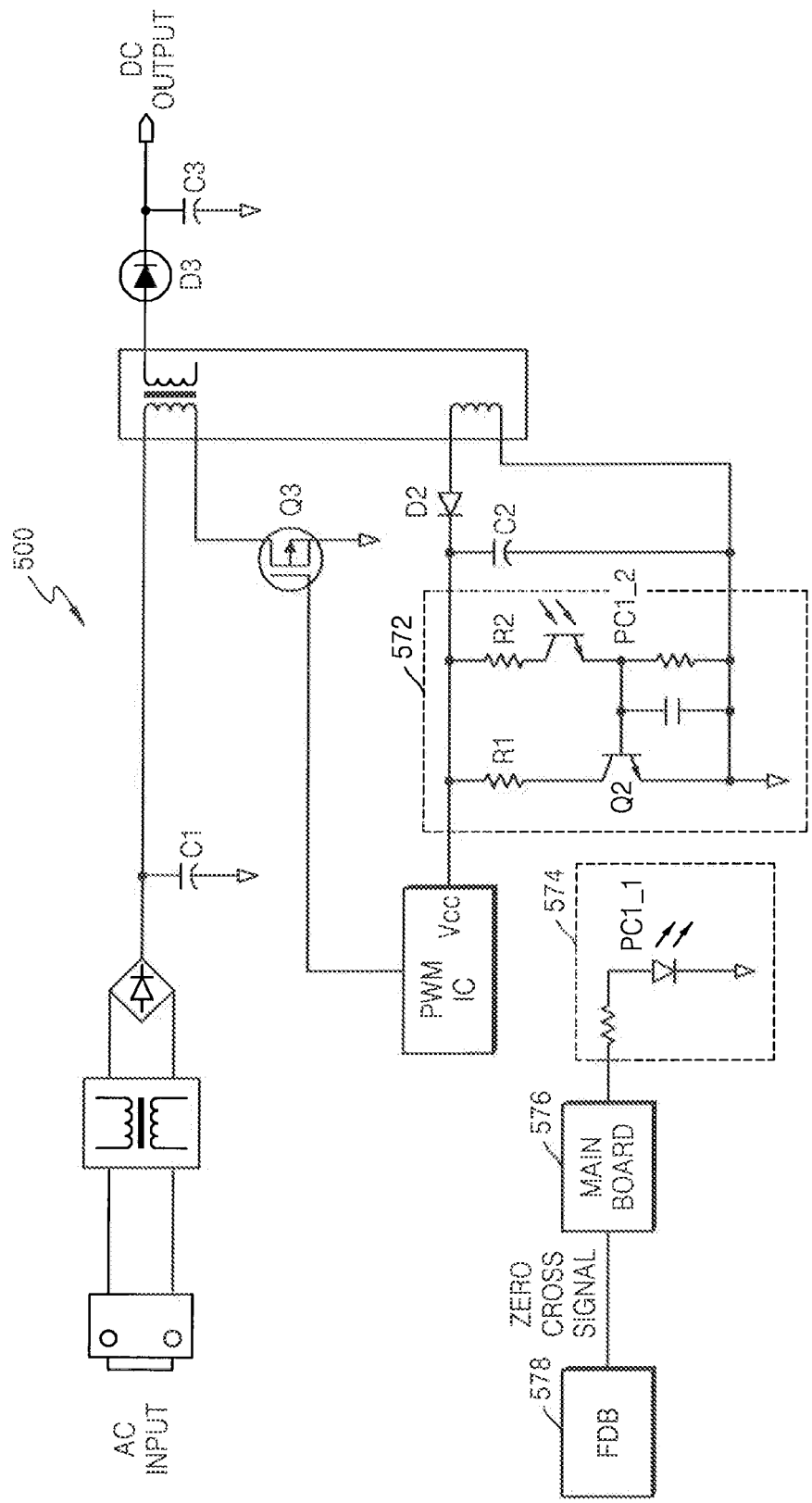
FIG. 5 is a circuit diagram illustrating an SMPS usable with an image forming apparatus according to an embodiment of the present general inventive concept.

FIG. 5 is a circuit diagram illustrating an SMPS 500 usable with an image forming apparatus according to an embodiment of the present inventive concept. Referring to FIG. 5, the SMPS 500 usable with the image forming apparatus may have similar structure to that of the SMPS 400 of FIG. 4, except for an electric power blocking unit 572 and a signal detector 574. The electric power blocking unit 572 and the signal detector 574 may be referred to as a blocking unit.

In the SMPS 400 of FIG. 4, the supply state of the electric power to the image forming apparatus is detected by sensing the electric power transferred from the AC power input unit 410 to the filter unit 420. According to the SMPS 500 of FIG. 5, the supply state of the electric power to the image forming apparatus is detected by sensing a zero cross signal generated in the image forming apparatus. The zero cross signal is generated when the electric power supplied to the image forming apparatus is turned on, and the zero cross signal is not generated when the electric power supplied to the image forming apparatus is turned off. Therefore, the supply state of the electric power to the image forming apparatus may be checked by using the zero cross signal. The zero cross signal may be a signal generated according to a change in the supply state of the electric power.

When the supply state of the electric power to the image forming apparatus is the turned-on state, the zero cross signal is output from a fuser drive board (FDB) 578 that drives a fuser in the image forming apparatus, and the output zero cross signal is input to a main board 576 of the image forming apparatus. The fuser and/or the FDB 578 may be disposed between a power source, for example, the SMPS 500, and a functional unit, for example, an image forming unit of the image forming apparatus such that the power is supplied to the functional unit to perform an image forming operation thereof. The fuser may be operable according to a main switch to connect and disconnect between the image forming apparatus and an external input power source, a user switch to connect and disconnect a power to a corresponding component (or unit) of the image forming apparatus, a component switch disposed to turn on or off a corresponding component (or unit) of the image forming apparatus, or a safety switch to turn on or off the power to the corresponding component or entire portion of the image forming apparatus. The image forming unit may include at least one electrical component and at least one mechanical component to perform the image forming operation of the image forming apparatus. When the supply state of the electric power to the image forming apparatus is the turned-off state, the zero cross signal is not input to the main board 576 of the image forming apparatus. When the zero cross signal is not input to the main board 576, the main board 576 controls a light emission diode PC1_1 of the signal detector 574 to be electrically conducted.

As illustrated in FIG. 5, the signal detector 574 may include a resistor and the light emission diode PC1_1. When the light emission diode PC1_1 is electrically conducted to emit light, a photo transistor PC1_2 of the electric power blocking unit 572 receives the emitted light and converts an optical energy of the received light to an electric energy. That is, the light emission diode PC1_1 performs as a light emission unit of a photo-coupler, and the photo transistor PC1_2 performs as a light receiving unit of the photo-coupler. When the photo transistor PC1_2 receives the light, a base terminal of the transistor Q2 is triggered so that the transistor Q2 is also electrically connected. The charges of the capacitor C2 are discharged to the resistor R1 that is connected to a collector terminal of the transistor Q2. Then, the voltage of the electric power input terminal Vcc of the PWM IC is rapidly changed to a voltage lower than a reset voltage of the PWM IC such that the PWM IC does not output the switching control signal.

Figure 6:
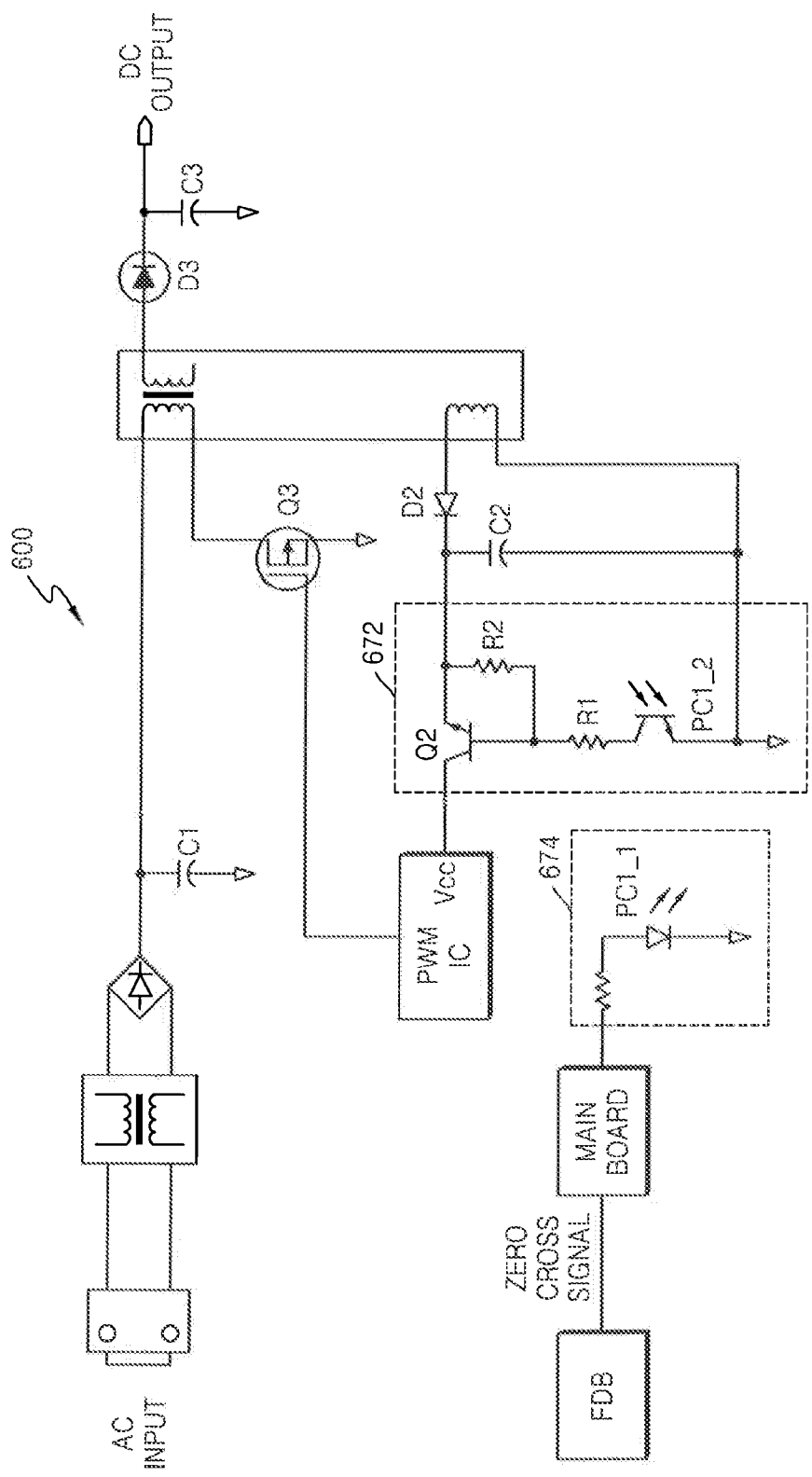
FIG. 6 is a circuit diagram illustrating an SMPS usable with an image forming apparatus according to an embodiment of the present general inventive concept.

FIG. 6 is a circuit diagram illustrating a SMPS 600 usable with an image forming apparatus according to an embodiment of the present inventive concept. Referring to FIG. 6, the SMPS 600 usable with the image forming apparatus may have similar structure to that of the SMPS 400 of FIG. 4 or the SMPS 500 of FIG. 5 except for an electric power blocking unit 672 and a signal detector 674. The electric power blocking unit 672 and the signal detector 674 may be referred to as a blocking unit.

In the SMPS 400 of FIG. 4, the supply state of the electric power to the image forming apparatus is detected by sensing the electric power transferred from the AC power input unit 410 to the filter unit 420. According to the SMPS 600 of FIG. 6, the supply state of the electric power to the image forming apparatus is detected by sensing a zero cross signal generated in the image forming apparatus, like in the SMPS 500 of FIG. 5. In addition, in the SMPS 400 of FIG. 4 and the SMPS 500 of FIG. 5, the discharging circuit generates a discharge so that the electric power is not input to the electric power input terminal of the PWM IC, and thus, the electric power input to the PWM IC may be blocked. However, according to the SMPS 600 of FIG. 6, a switching circuit is located in front of the electric power input terminal of the PWM IC to open and close the circuit, and then, a switching device of the switching circuit is opened so that the electric power may not be supplied to the electric power input terminal of the PWM IC.

When the supply state of the electric power to the image forming apparatus is the turned-on state, the zero cross signal output from a fuser drive board (FDB) that drives a fuser of the image forming apparatus is input to a main board of the image forming apparatus. When the supply state of the electric power to the image forming apparatus is the turned-off state, the zero cross signal is not input to the main board of the image forming apparatus. When the zero cross signal is not input to the main board, the main board controls the light emission diode PC1_1 not to emit light. As illustrated in FIG. 6, the signal detector 674 may include a resistor and the light emission diode PC1_1. When the light emission diode PC1_1 does not emit light, the photo transistor PC1_2 of the electric power blocking unit 672 does not receive light and the photo transistor PC1_2 does not operate. When the photo transistor PC1_2 does not operate, the transistor Q2 does not operate, and the switching circuit is opened. Then, the electric power input terminal of the PWM IC is blocked, and the voltage at the electric power input terminal is rapidly changed to a voltage lower than a reset voltage of the PWM IC such that the PWM IC does not output the switching control signal.

Figure 7:
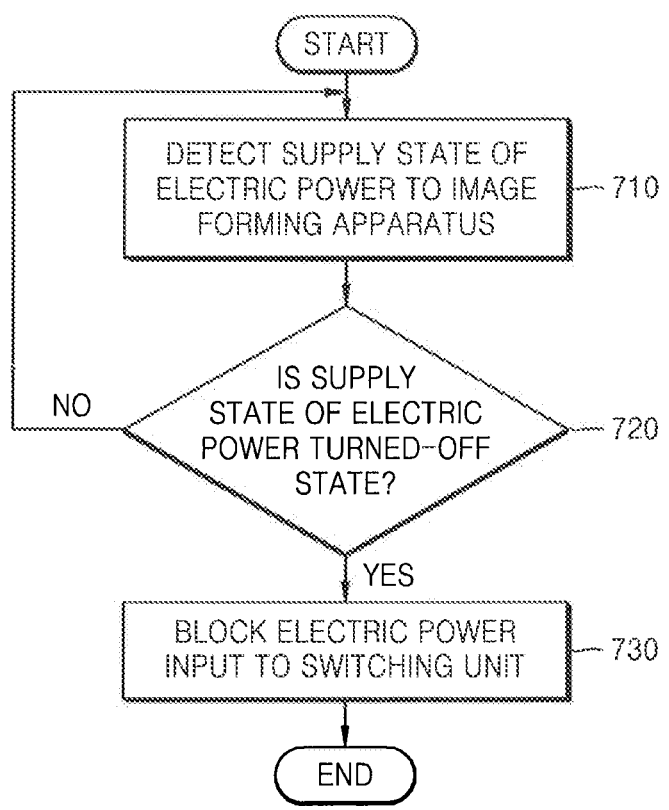
FIG. 7 is a flowchart illustrating a method of supplying electric power to an image forming apparatus by using an SMPS according to an embodiment of the present general inventive concept.

FIG. 7 is a flowchart illustrating a method of supplying an electric power to an image forming apparatus by an SMPS according to an embodiment of the present general inventive concept.

Referring to FIGS. 3 and 7, the signal detector 374 senses a signal representing a supply state of the electric power to the image forming apparatus at operation S710. For example, the signal detector 374 may sense the AC power input from an external electric power supply source or a zero cross signal generated in the image forming apparatus to sense the signal representing the supply state of the electric power to the image forming apparatus. The signal detector 374 transfers the sensed signal to the electric power blocking unit 372 that is connected to the electric power input terminal of the switching unit 360.

In operation S720, the electric power blocking unit 372 receives the signal representing the supply state of the electric power to the image forming apparatus from the signal detector 374 and determines whether the electric power supplied to the electric power input terminal of the switching unit 360 is blocked or to be blocked. When the supply state of the electric power to the image forming apparatus is the turned-on state, the SMPS receives the AC power and outputs an appropriate DC voltage, and then, the process goes back to operation S710 to continuously sense the signal representing the supply state of the electric power. However, when the supply state of the electric power to the image forming apparatus is the turned-off state, the process goes to operation S730.

In operation S730, the electric power blocking unit 372 blocks the electric power input to the electric power input terminal of the switching unit 360, that is, the switch controller 364, when the supply state of the electric power to the image forming apparatus becomes or changed to the turned-off state. The input of the electric power may be blocked by locating a switching circuit including a switching device on a line of the electric power input terminal of the switch controller 364 and opening the switching device, and/or by forming a discharging circuit so that the electric power cannot be input to the electric power input terminal of the switch controller 364. When the electric power input to the electric power input terminal of the switch controller 364 is blocked, the voltage at the electric power input terminal of the switch controller 364 is rapidly decreased to a voltage lower than a reset voltage of the switch controller 364, and thus, the switch controller 364 does not output the switching control signal to the main switch 362.

Figure 8:
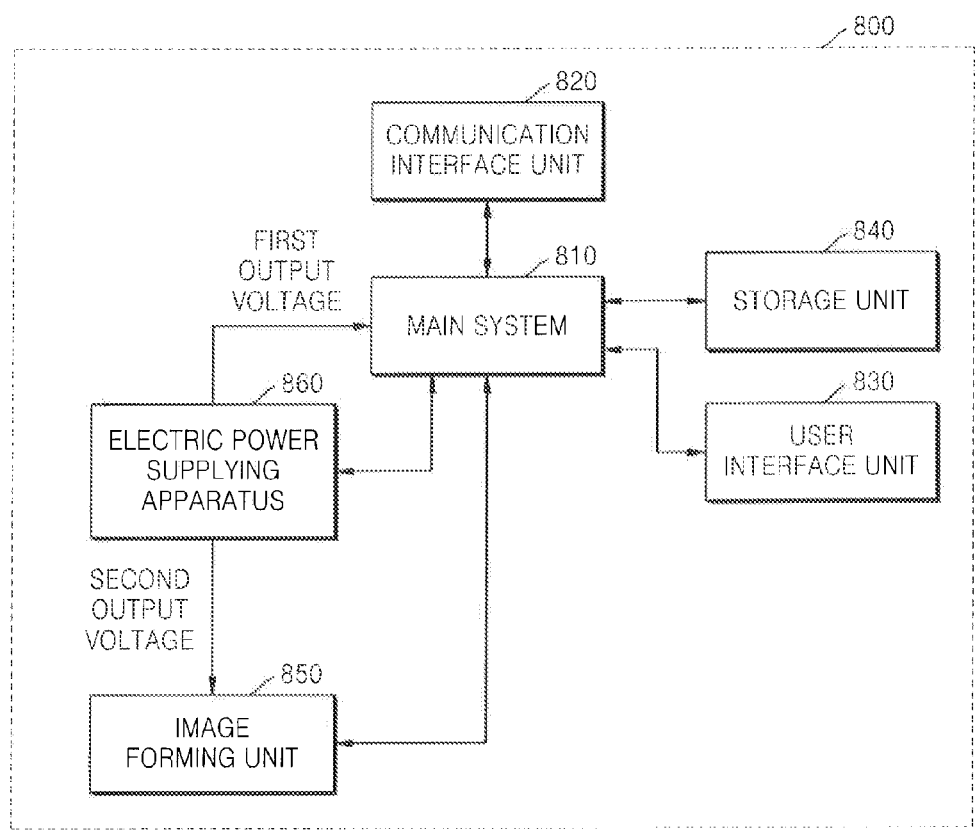
FIG. 8 is a block diagram illustrating an image forming apparatus including an SMPS according to an embodiment of the present general inventive concept.

FIG. 8 is a block diagram illustrating an image forming apparatus 800 including an SMPS according to an embodiment of the present inventive concept. Referring to FIG. 8, the image forming apparatus 800 includes a main system 810, a communication interface unit 820, a user interface unit 830, a storage unit 840, an image forming unit 850, and an electric power supplying apparatus 860. Here, the electric power supplying apparatus 860 may be an SMPS according to the embodiments of the present inventive concept. The image forming apparatus 800 may further include components (or units) to perform a function thereof other than the components (units) illustrated in FIG. 8. For example, a scanning unit or a fax unit may be further included in the image forming apparatus 800.

The main system 810 controls overall functions of the image forming apparatus 800. The main system 810 may include a controller to control the functions of the image forming apparatus 800. The main system 810 may be driven by a first output voltage output from the electric power supplying apparatus 860, and the first output voltage may be a DC voltage of 3.3 V or 5 V. However, the present inventive concept is not limited thereto. Various voltages can be output from the electric power supplying apparatus 860, and/or a voltage other than the DC voltage can be usable to drive the main system 810.

The communication interface unit 820 of the present embodiment may include a modem usable to send/receive facsimiles, a network module to connect to a network, and a USB host module to form a data conveying channel with a portable storage medium. Here, an external apparatus is connected to the image forming apparatus 800 through a wired or wireless network, and may be a fax machine, a computer system, a mobile terminal, a tablet computer apparatus, a personal digital assistants (PDAs), or a server.

The user interface unit 830 receives input signals from a user and displays information to the user. For example, the user interface unit 830 may include input/output apparatuses formed on the image forming apparatus 800, such as a display panel, a mouse, a keyboard, a touch-screen, a monitor, and a speaker.

The storage unit 840 stores data generating during operations of the image forming apparatus 800, printing data, or scan data.

The image forming unit 850 performs a printing operation to form an image and/or to print the printing data corresponding to the image on a printing medium. The image forming unit 850 may include hardware units to perform one or more processes, such as charging, exposure, developing, transferring, and fusing for performing the printing operation, and software modules to drive the hardware units. The image forming unit 850 may be driven by a second output voltage output from the electric power supplying unit 860, and the second output voltage may be a DC voltage of 12 V or 24 V; however, the present inventive concept is not limited thereto.

Since the electric power supplying apparatus 860 performs the operations of the SMPS described with reference to FIGS. 3 through 6, the descriptions about FIGS. 3 through 6 may be applied to the electric power supplying apparatus 860 of FIG. 8.

According to an SMPS of the present inventive concept, when electric power supplied to an image forming apparatus is turned off, electric charges charged in the capacitor of the SMPS are discharged, and accordingly, an error or a malfunction in rebooting of the image forming apparatus, which may be caused by a temporary rising of the output voltage from the SMPS, may be prevented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A switching mode power supply (SMPS) usable with an image forming apparatus to receive an alternating current (AC) power from an external electric power supply source and to output a direct current (DC) power, the SMPS comprising:
    a transformer to transform an electric power input to a primary coil and to output the transformed electric power to a secondary coil;
    a switching device comprising a main switch connected to the primary coil to adjust the output electric power of the transformer and a switch controller connected to the main switch to control a switching operation of the main switch; and
    a blocking device to block an electric power input to the switching controller when a supply state of an electric power to the image forming apparatus is a turned-off state,
    wherein, when the supply state of the electric power to the image forming apparatus is the turned-off state, the blocking device discharges a potential remaining on a passage from the secondary coil to the switching controller so that an output voltage of the SMPS is lowered below a reset voltage of the image forming apparatus to allow a rebooting of the image forming apparatus.

2. The SMPS of claim 1, wherein the blocking device comprises:
    a signal detector to detect the supply state of the electric power to the image forming apparatus, and
    an electric power blocking device to block the electric power input to the switching controller of the switching device according to a detection corresponding to the supply state.

3. The SMPS of claim 2, wherein the signal detector detects the supply state by sensing the AC power received from the external electric power supply source.

4. The SMPS of claim 2, wherein the signal detector detects the supply state by sensing a zero cross signal generated in the image forming apparatus.

5. The SMPS of claim 2, wherein:
    the electric power blocking device comprises a discharging circuit located between an electric power supplying terminal to supply the electric power input to the switching device and the switching device to discharge electric charges that are charged in the electric power supplying terminal; and
    the electric power blocking device blocks the electric power input to the switching device by discharging the electric charges of the electric power supplying terminal when the supply state of the electric power to the image forming apparatus is the turned-off state.

6. The SMPS of claim 2, wherein the electric power blocking device comprises a switching circuit to open and close a connection between an electric power supplying terminal to supply the electric power input to the switching device and the switching device, and the electric power blocking device blocks the electric power input to the switching device by opening the switching circuit when the supply state of the electric power to the image forming apparatus is the turned-off state.

7. A method of supplying an electric power of a switching mode power supply (SMPS) in an image forming apparatus, the method comprising:
transforming an electric power using a transformer of an SMPS;
determining a supply state of the electric power to an image forming apparatus; and
blocking an electric power input to a switching controller connected to a main switch to control the switching operation of the main switch that adjusts an output electric power of the transformer when the determined supply state of the electric power to the image forming apparatus is a turned-off state,
wherein, when the determined supply state of the electric power to the image forming apparatus is the turned-off state, the blocking of the electric power input to the switching controller comprises discharging a potential remaining on a passage from an output of the transformer to the switching controller so that an output voltage of the SMPS is lowered below a reset voltage of the image forming apparatus to allow a rebooting of the image forming apparatus.

8. The method of claim 7, wherein the determining of the supply state comprises sensing an alternating current (AC) power input from an external electric power supply source.

9. The method of claim 7, wherein the determining of the supply state comprises sensing a zero cross signal generated in the image forming apparatus.

10. The method of claim 7, wherein the blocking of the electric power input to the switching controller comprises discharging electric charges that are charged in an electric power supplying terminal that supplies the electric power input to the switching controller, when the supply state of the electric power to the image forming apparatus is a turned-off state.

11. The method of claim 7, wherein the blocking of the electric power input to the switching controller comprises opening a switching circuit that opens/closes connection between an electric power supplying terminal that supplies the electric power input to the switching controller and the switching controller, when the supply state of the electric power to the image forming apparatus is the turned-off state.

12. An image forming apparatus comprising:
an image forming unit to perform an image on a printing medium; and
a switching mode power supply (SMPS) to receive an alternating current (AC) power from an external electric power supply source and to output a direct current (DC) power to the image forming unit, wherein the SMPS comprises:
a transformer to transform an electric power input to a primary coil and to output the transformed electric power to a secondary coil;
a switching device comprising a main switch connected to the primary coil to adjust the output electric power of the transformer and a switch controller connected to the main switch to control a switching operation of the main switch; and
a blocking device to block an electric power input to the switching controller when a supply state of an electric power to the image forming apparatus is a turned-off state,
wherein, when the supply state of the electric power to the image forming apparatus is the turned-off state, the blocking device discharges a potential remaining on a passage from the secondary coil to the switching controller so that an output voltage of the SMPS is lowered below a reset voltage of the image forming apparatus to allow a rebooting of the image forming apparatus.

13. The image forming apparatus of claim 12, wherein the blocking device comprises:
a signal detector to detect the supply state of the electric power to the image forming apparatus; and
an electric power blocking device to block the electric power input to the switching controller of the switching device according to the detected supply state.

14. A switching mode power supply (SMPS) usable with an image forming apparatus to receive an alternating current (AC) power from an external electric power supply source and to output a direct current (DC) power, the SMPS comprising:
a transformer having a primary coil and a secondary coil to generate a driving voltage;
a switching device configured to receive the driving voltage and to perform a switching operation on the primary coil according to the received driving voltage, the switching device comprising a switching controller; and
a blocking device configured to block the driving voltage input to the switching controller of the switching device when a supply state of an electric power to the image forming apparatus is a turned-off state,
wherein the blocking device discharges a potential remaining on a passage from the secondary coil to the switching controller until the driving voltage is lower than a reset voltage of the image forming apparatus to allow a rebooting of the image forming apparatus.

15. The SMPS of claim 14, wherein the secondary coil comprises
a sub-secondary coil to generate one or more output voltages usable in one or more components of the image forming apparatus, and
an auxiliary coil to generate the driving voltage usable in the switching device.

16. The SMPS of claim 14, wherein the blocking device is disposed between the switching device and the secondary coil to transmit the driving voltage from the secondary coil to the switching device and to disconnect the driving voltage from the switching device.

17. The SMPS of claim 14, wherein the blocking device comprises
a detector to detect the supply state from at least one of an input of the SMPS,
an output of the SMPS, and
a power on/off switch of one or more components of the image forming apparatus.

* * * * *